United States Patent
Jin et al.

(10) Patent No.: US 12,206,514 B2
(45) Date of Patent: Jan. 21, 2025

(54) TRANSMITTER AND TRANSCEIVER INCLUDING THE SAME

(71) Applicant: SAMSUNG DISPLAY CO., LTD., Yongin-si (KR)

(72) Inventors: Tae Young Jin, Yongin-si (KR); Jun Dal Kim, Yongin-si (KR); Hyun Su Kim, Yongin-si (KR); Kyung Youl Min, Yongin-si (KR); Dong Won Park, Yongin-si (KR); Jong Man Bae, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 106 days.

(21) Appl. No.: 18/128,323

(22) Filed: Mar. 30, 2023

(65) Prior Publication Data

US 2023/0318860 A1 Oct. 5, 2023

(30) Foreign Application Priority Data

Apr. 5, 2022 (KR) .................. 10-2022-0042504

(51) Int. Cl.
*H04L 12/12* (2006.01)
*H04L 25/49* (2006.01)

(52) U.S. Cl.
CPC .......... *H04L 12/12* (2013.01); *H04L 25/4917* (2013.01)

(58) Field of Classification Search
CPC ............. H04B 1/04; H04B 1/40; H04L 12/12; H04L 25/4917; H04L 7/041; H04L 25/028; H03K 19/21
See application file for complete search history.

(56) References Cited

U.S. PATENT DOCUMENTS

| 10,917,265 | B2* | 2/2021 | Sugioka | H04L 25/029 |
| 2017/0373704 | A1* | 12/2017 | Nakamura | H03M 13/23 |
| 2019/0260441 | A1* | 8/2019 | Akuon | H04L 27/30 |
| 2019/0379565 | A1* | 12/2019 | Ma | H04B 7/0452 |

FOREIGN PATENT DOCUMENTS

| KR | 101105175 B1 | 1/2012 |
| KR | 101178080 B1 | 8/2012 |
| WO | 2004110021 A2 | 12/2004 |
| WO | 2005018191 A2 | 2/2005 |

* cited by examiner

*Primary Examiner* — Dac V Ha
(74) *Attorney, Agent, or Firm* — CANTOR COLBURN LLP

(57) ABSTRACT

A transmitter includes a transmission controller which outputs original data through an original data lane, an encoder which encodes the original data into encoded data and outputs the encoded data through an encoded data lane, and a transmission driver which outputs the encoded data at a speed of M (M is a real number greater than 0) gigabits per second through a transmission and reception interface. The transmission driver provides a first clock signal corresponding to an output speed to the encoder, the encoder provides a second clock signal having a second frequency less than a first frequency of the first clock signal to the transmission controller, the transmission controller outputs the original data based on the second clock signal, and the encoder outputs the encoded data based on the first clock signal.

20 Claims, 13 Drawing Sheets

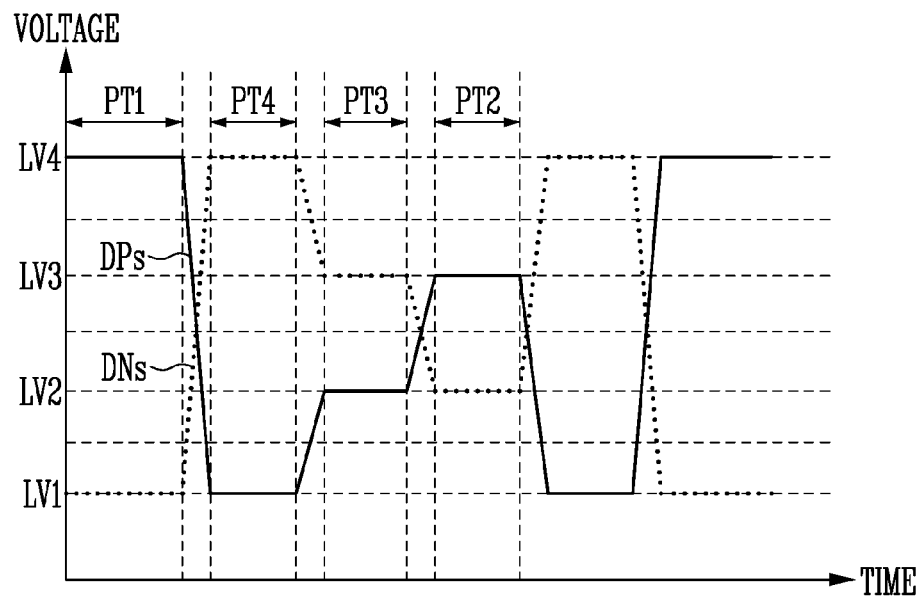

TRANSMITTER AND TRANSCEIVER INCLUDING THE SAME

This application claims priority to Korean Patent Application No. 10-2022-0042504, filed on Apr. 5, 2022, and all the benefits accruing therefrom under 35 U.S.C. § 119, the content of which in its entirety is herein incorporated by reference.

BACKGROUND

1. Field

The disclosure relates to a transmitter and a transceiver including the same.

2. Description of the Related Art

As information technology develops, a data transmission technology between a plurality of devices is receiving attention. For modulation among data transmission technologies, technologies of pulse amplitude modulation 4 ("PAM4"), non-return-to-zero ("NRZ"), or the like are widely used.

Since the PAM4 may transmit data twice as compared to the NRZ, the PAM4 is widely used for high-resolution and high-frequency data transmission. In order to generate a clock signal in a receiver using transmitted data, a frequent transition of data is desired. For such a transition, encoding at a transmission end and decoding at a reception end are desired, and at this time, generation an overhead packet independent of actual data is desired.

SUMMARY

A technical feature to be solved is to provide a transmitter capable of reducing power consumption by differently applying a frequency of a clock signal according to presence or absence of an overhead packet of each lane, and a transceiver including the transmitter.

A technical feature to be solved is to provide a transmitter capable of reducing power consumption by applying a clock signal having a minimum frequency according to a maximum bitwidth of each lane, and a transceiver including the transmitter.

In an embodiment of the disclosure, a transmitter includes a transmission controller which outputs original data through an original data lane, an encoder which encodes the original data into encoded data and outputs the encoded data through an encoded data lane, and a transmission driver which outputs the encoded data at a speed of M (M is a real number greater than 0) gigabits per second (Gbps) through a transmission and reception interface. The transmission driver provides a first clock signal corresponding to an output speed to the encoder, the encoder provides a second clock signal having a second frequency less than a first frequency of the first clock signal to the transmission controller, the transmission controller outputs the original data based on the second clock signal, and the encoder outputs the encoded data based on the first clock signal.

In an embodiment, the original data may include original packets, the encoded data may include an overhead packet and encoded packets corresponding to the overhead packet, a number of the original packets and a number of the encoded packets may be identical to each other, and the encoder may encode the original packets into the encoded packets using the overhead packet.

In an embodiment, the encoder may generate the encoded packets by performing an exclusive OR ("XOR") operation on the overhead packet and the original packets.

In an embodiment, the second frequency may be p/q of the first frequency, the q may be an integer obtained by adding a number of the overhead packet and the number of the encoded packets corresponding to the overhead packet, and the p may be an integer obtained by subtracting the number of the overhead packet from q.

In an embodiment of the disclosure, a transmitter includes a transmission controller which outputs first original data through a first original data lane and outputs second original data through a second original data lane, a mapper which generates mapping data by mapping the first original data and the second original data, an encoder which encodes the mapping data into encoded data and outputs the encoded data through an encoded data lane, and a transmission driver which outputs the encoded data at a speed of M (M is a real number greater than 0) Gbps through a transmission and reception interface. The transmission driver provides a first clock signal corresponding to an output speed to the encoder, and the encoder outputs the encoded data based on the first clock signal.

In an embodiment, the encoder may output the encoded data at the speed of M Gbps through the encoded data lane, the transmission controller may output the first original data at a speed of M/2 Gbps or less through the first original data lane, and the transmission controller may output the second original data at the speed of M/2 Gbps or less through the second original data lane.

In an embodiment, the first original data lane may be configured of N (N is an integer greater than 0) parallel lines, the second original data lane may be configured of N parallel lines, and the encoded data lane may be configured of 2N parallel lines.

In an embodiment, the first frequency of the first clock signal may be M*1000/2N megahertz (MHz).

In an embodiment, the encoder may provide a second clock signal having a second frequency less than the first frequency of the first clock signal to the transmission controller, and the transmission controller may output the first original data and the second original data based on the second clock signal.

In an embodiment, the mapping data may include original packets, the encoded data may include an overhead packet and encoded packets corresponding to the overhead packet, a number of the original packets and a number of the encoded packets may be identical to each other, and the encoder may encode the original packets into the encoded packets using the overhead packet.

In an embodiment, the encoder may generate the encoded packets by performing an XOR operation on the overhead packet and the original packets.

In an embodiment, the second frequency may be p/q of the first frequency, the q may be an integer obtained by adding a number of the overhead packet and the number of the encoded packets corresponding to the overhead packet, and the p may be an integer obtained by subtracting the number of the overhead packet from q.

In an embodiment of the disclosure, a transceiver includes a transmitter and a receiver connected through a transmission and reception interface. The transmitter includes a transmission controller which outputs first original data through a first original data lane and outputs second original data through a second original data lane, a mapper which generates mapping data by mapping the first original data and the second original data, an encoder which encodes the mapping data into encoded data and outputs the encoded data through an encoded data lane, and a transmission driver which outputs the encoded data at a speed of M (M is a real number greater than 0) Gbps through the transmission and reception interface. The transmission driver provides a first clock signal corresponding to an output speed to the encoder, and the encoder outputs the encoded data based on the first clock signal.

In an embodiment, the encoder may output the encoded data at the speed of M Gbps through the encoded data lane, the transmission controller may output the first original data at a speed of M/2 Gbps or less through the first original data lane, and the transmission controller may output the second original data at the speed of M/2 Gbps or less through the second original data lane.

In an embodiment, the first original data lane may be configured of N (N is an integer greater than 0) parallel lines, the second original data lane may be configured of N parallel lines, and the encoded data lane may be configured of 2N parallel lines.

In an embodiment, a first frequency of the first clock signal may be M*1000/2N MHz.

In an embodiment, the encoder may provide a second clock signal having a second frequency less than a first frequency of the first clock signal to the transmission controller, and the transmission controller may output the first original data and the second original data based on the second clock signal.

In an embodiment, the mapping data may include original packets, the encoded data may include an overhead packet and encoded packets corresponding to the overhead packet, a number of the original packets and a number of the encoded packets may be identical to each other, and the encoder may encode the original packets into the encoded packets using the overhead packet.

In an embodiment, the encoder may generate the encoded packets by performing an XOR operation on the overhead packet and the original packets.

In an embodiment, the second frequency may be p/q of the first frequency, the q may be an integer obtained by adding a number of the overhead packet and the number of the encoded packets corresponding to the overhead packet, and the p may be an integer obtained by subtracting the number of the overhead packet from q.

In an embodiment, the transmitter and the transceiver including the same according to the disclosure may reduce power consumption by differently applying a frequency of a clock signal according to presence or absence of an overhead packet of each lane.

In an embodiment, the transmitter and the transceiver including the same according to the disclosure may reduce power consumption by applying a clock signal having a minimum frequency according to a maximum bitwidth of each lane.

BRIEF DESCRIPTION OF THE DRAWINGS

The above and other features of the disclosure will become more apparent by describing in further detail embodiments thereof with reference to the accompanying drawings, in which:

FIGS. 4 and 5 are diagrams illustrating an embodiment of a transmission driver and an analog front-end according to the disclosure;

DETAILED DESCRIPTION

Figure 1:
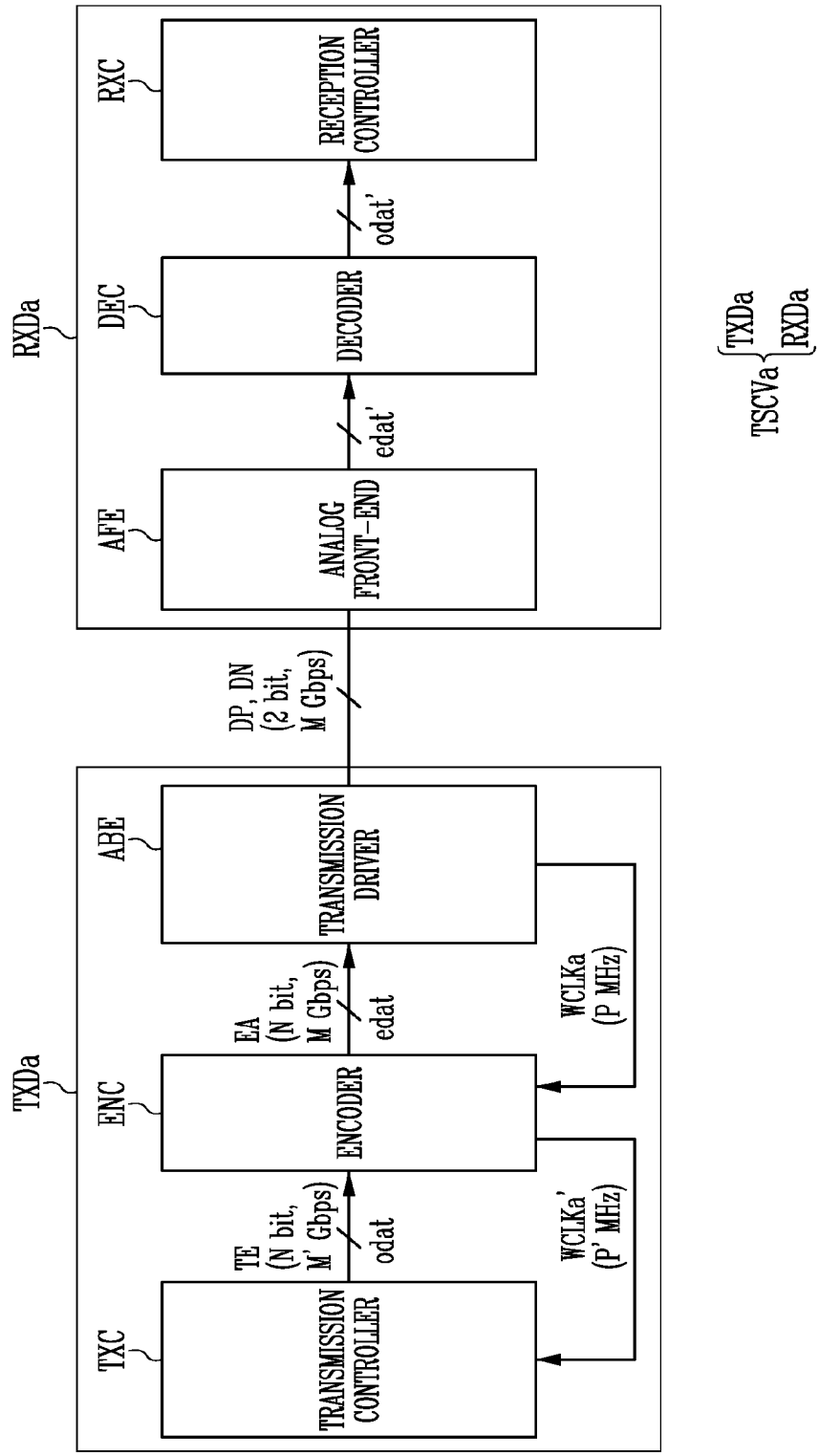
FIG. 1 is a diagram illustrating an embodiment of a transceiver according to the disclosure.

Hereinafter, various embodiments of the disclosure will be described in detail with reference to the accompanying drawings so that those skilled in the art may easily carry out the disclosure. The disclosure may be implemented in various different forms and is not limited to the embodiments described herein.

In order to clearly describe the disclosure, parts that are not related to the description are omitted, and the same or similar elements are denoted by the same reference numerals throughout the specification. Therefore, the above-described reference numerals may be used in other drawings.

In addition, sizes and thicknesses of each component shown in the drawings are arbitrarily shown for convenience of description, and thus the disclosure is not necessarily limited to those shown in the drawings. In the drawings, thicknesses may be exaggerated to clearly express various layers and areas.

In addition, an expression "is the same" in the description may mean "is substantially the same". That is, the expression "is the same" may be the same enough for those of ordinary skill to understand that it is the same. Other expressions may also be expressions in which "substantially" is omitted.

Figure 2:
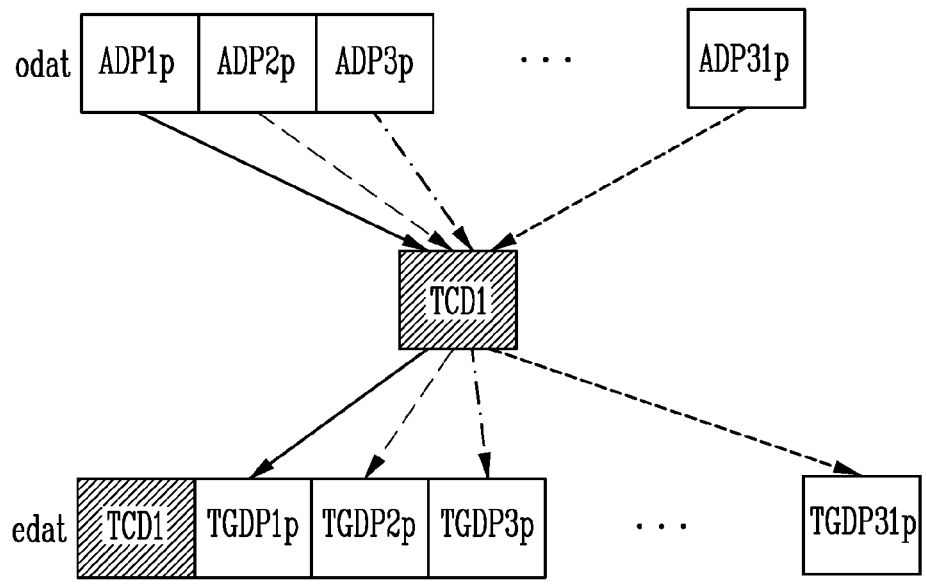
FIG. 2 is a diagram illustrating an embodiment of an encoder according to the disclosure.
Figure 3:
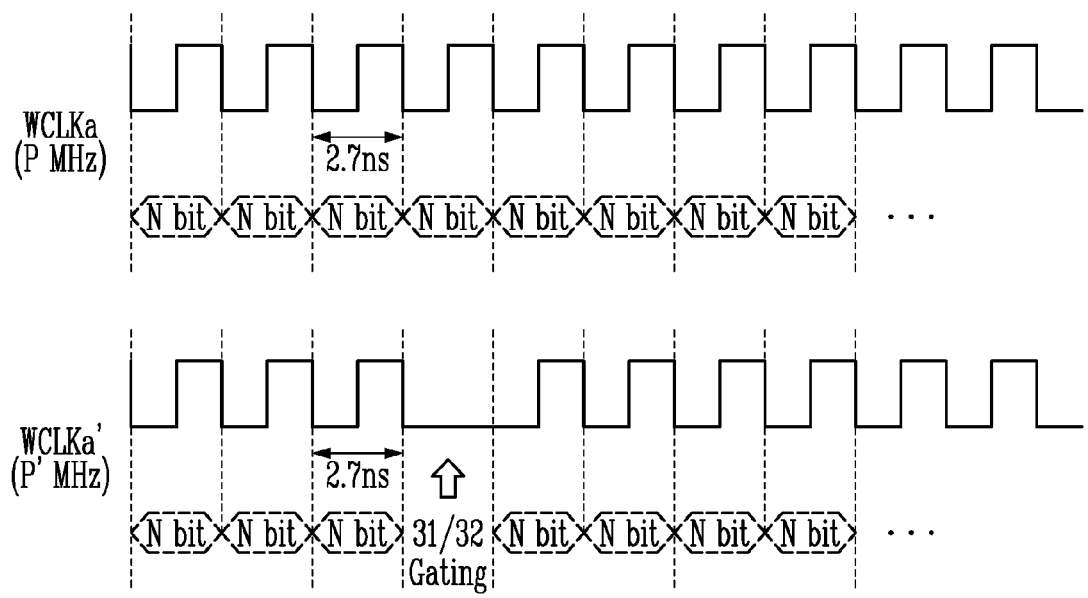
FIG. 3 is a diagram illustrating an embodiment of a first clock signal and a second clock signal according to the disclosure.
Figure 6:
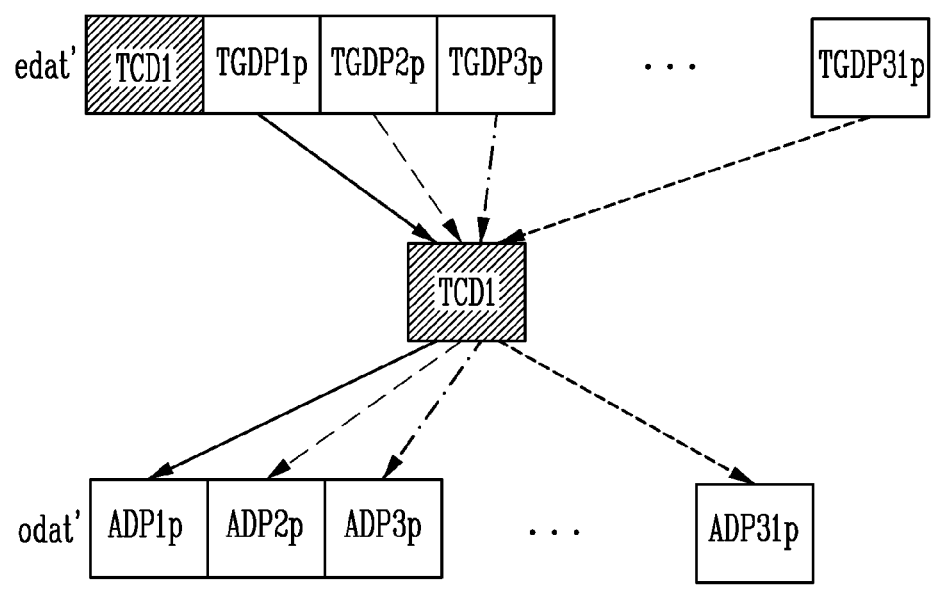
FIG. 6 is a diagram illustrating an embodiment of a decoder according to the disclosure.
Figure 7:
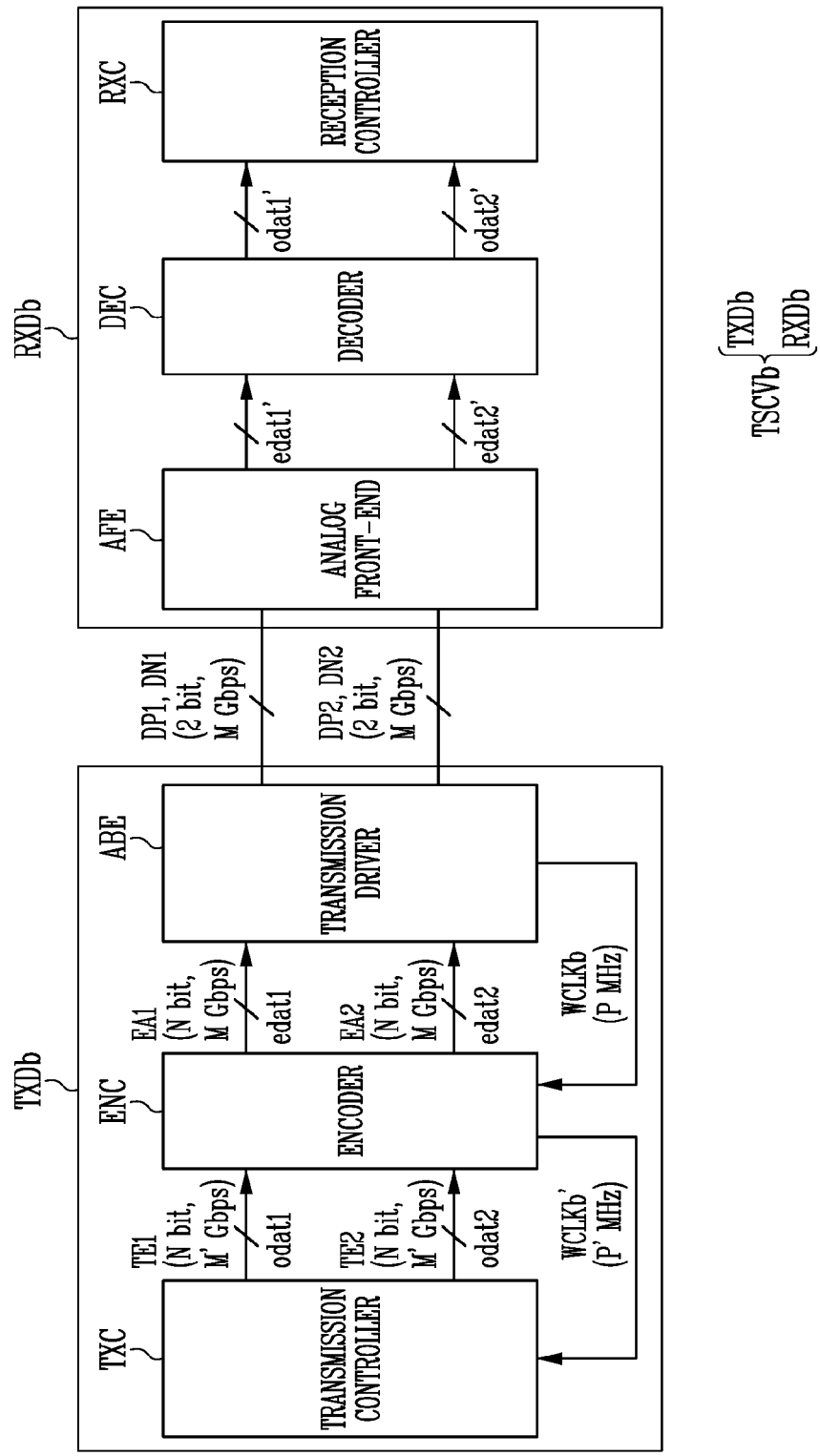
FIG. 7 is a diagram illustrating another embodiment of a transceiver according to the disclosure.

FIG. 1 is a diagram illustrating an embodiment of a transceiver according to the disclosure. FIG. 2 is a diagram illustrating an embodiment of an encoder according to the disclosure. FIG. 3 is a diagram illustrating an embodiment of a first clock signal and a second clock signal according to the disclosure. FIGS. 4 and 5 are diagrams illustrating an embodiment of a transmission driver and an analog front-end according to the disclosure. FIG. 6 is a diagram illustrating an embodiment of a decoder according to the disclosure. FIG. 7 is a diagram illustrating another embodiment of a transceiver according to the disclosure.

Referring to FIG. 1, a transceiver TSCVa in an embodiment of the disclosure may include a transmitter TXDa and a receiver RXDa.

The transmitter TXDa may include a transmission controller TXC, an encoder ENC, and a transmission driver ABE.

The transmission controller TXC may output original data odat through an original data lane TE. The transmission controller TXC may be an independent dedicated controller of the transmitter TXDa itself, or may be a portion of a general-purpose controller of a device in which the transmitter TXDa is used.

The encoder ENC may encode the original data odat into encoded data edat and output the encoded data edat through an encoded data lane EA.

An encoding process of the encoder ENC is described with reference to FIG. 2. The original data odat may include original packets ADP1$p$, ADP2$p$, ADP3$p$, . . . , and ADP31$p$. The encoder ENC may generate an overhead packet TCD1 different from the received original packets ADP1$p$ to ADP31$p$. The number of bits of the overhead packet TCD1 and the number of bits of each of the original packets ADP1$p$ to ADP31$p$ may be set to be the same. In an embodiment, when the number of bits of the overhead packet TCD1 is set to 6 bits, each of the original packets ADP1$p$ to ADP31$p$ may be set to 6 bits, for example. A first bit of the overhead packet TCD1, that is, a most significant bit ("MSB") may be a transition bit set to have a logic level different from that of an immediately previous bit. In an embodiment, when the immediately previous bit of the overhead packet TCD1 is 0 in the encoded data edat, the MSB of the overhead packet TCD1 may be set to 1, for example. When the immediately previous bit of the overhead packet TCD1 is 1 in the encoded data edat, the MSB of the overhead packet TCD1 may be set to 0.

Bits (e.g., 5 least significant bits ("LSBs")) other than the MSB of the overhead packet TCD1 may be set differently from those of the original packets ADP1$p$ to ADP31$p$. In an embodiment, when the MSB (e.g., the first bit) of the original packet is 0, the LSB of the overhead packet TCD1 may be set so that the bits (e.g., 5 LSBs) other than the MSB of the original packet and the LSB of the overhead packet TCD1 are different from each other, for example. When the MSB of the original packet is 1, the LSB of the overhead packet TCD1 may be set so that an LSB of a complement of the original packet and the LSB of the overhead packet TCD1 are different from each other. The complement of the original packet refers to a packet in which bits of the original packet are inverted. In an embodiment, when the original packet is 110110, the complement of the original packet is 001001, for example.

The encoder ENC may encode the original packets ADP1$p$ to ADP31$p$ into encoded packets TGDP1$p$, TGDP2$p$, TGDP3$p$, . . . , and TGDP31$p$ using the overhead packet TCD1. The number of original packets ADP1$p$ to ADP31$p$ and the number of encoded packets TGDP1$p$ to TGDP31$p$ may be the same. In an embodiment, the encoder ENC may generate the encoded packets TGDP1$p$ to TGDP31$p$ by performing an exclusive OR ("XOR") operation on the overhead packet TCD1 and the original packets ADP1$p$ to ADP31$p$, for example. In an embodiment, the encoder ENC may generate the encoded packet TGDP1$p$ by performing the XOR operation on corresponding bits of the original packet ADP1$p$ and the overhead packet TCD1, for example. In an embodiment, when the original packet ADP1$p$ is 010111 and the overhead packet TCD1 is 001101, the encoded packet TGDP1$p$ may be set to 011010, for example. The encoded packets TGDP1$p$ to TGDP31$p$ may guarantee a frequent transition, and thus may be effective a clock recovery operation of the receiver RXDa.

When the number of bits configuring the overhead packet TCD1 is N, the number of encoded packets TGDP1$p$ to TGDP31$p$ corresponding to the overhead packet TCD1 may be $(2^{(N-1)})-1$. Here, "the overhead packet and the encoded packets correspond" means that the overhead packet TCD1 is used in the generation of the encoded packets TGDP1$p$ to TGDP31$p$. In an embodiment, when the number of bits configuring the overhead packet TCD1 is 6, the number of encoded packets TGDP1$p$ to TGDP31$p$ corresponding to the overhead packet TCD1 may be 31, for example. This is to ensure that the LSB of the overhead packet TCD1 and the LSB of 31 original packets ADP1$p$ to ADP31$p$ (or complements thereof) are different from each other because 5 LSBs of the overhead packet TCD1 include the number of 32 cases as described above.

Referring to FIG. 3, a first clock signal WCLKa and a second clock signal WCLKa' are illustrated as an example.

The transmission driver ABE may output the encoded data edat through a transmission and reception interface (here, a first transmission line DP and a second transmission line DN in FIG. 1) at a speed of M (M is a real number greater than 0) gigabits per second (Gbps).

In order for the transmission driver ABE to output data without delay, an output speed (M Gbps) of the encoder ENC is desired to match an output speed (M Gbps) of the transmission driver ABE. In an embodiment, the output speed (M Gbps) of the encoder ENC may be equal to or greater than the output speed (M Gbps) of the transmission driver ABE, for example.

To this end, the transmission driver ABE may provide the first clock signal WCLKa corresponding to the output speed (M Gbps) to the encoder ENC. The encoder ENC may output the encoded data edat based on the first clock signal WCLKa. At this time, it is assumed that a bitwidth of an encoded data lane EA is N bit. In an embodiment, the encoded data lane EA may be configured of N parallel lines (or wires), for example. At this time, the encoded data lane EA may transmit the encoded data edat of N bit per one clock. In this case, in order for the encoder ENC to reach the output speed (M Gbps), a minimum frequency of the first clock signal WCLKa is P megahertz (MHz), and is desired to satisfy Equation 1 below.

$$P \text{ MHz}=(M \text{ Gbps})*1000/N \quad \text{[Equation 1]}$$

In an embodiment, when using an encoded data lane EA having a bitwidth of 16 bits (N=16), when the output speed of the encoder ENC is to be 6 Gbps (M=6), the minimum frequency of the first clock signal WCLKa is desired to be 375 MHz (P=375), for example.

Similarly, in order for the encoder ENC to output data without delay, an output speed (M' Gbps) of the transmission controller TXC is desired to match the output speed (M Gbps) of the encoder ENC. At this time, in the illustrated embodiment, the output speed (M' Gbps) of the transmission controller TXC may be less than the output speed (M Gbps) of the encoder ENC.

In an embodiment, the encoder ENC may provide the second clock signal WCLKa' having a second frequency (P' MHz) less than the first frequency (P MHz) of the first clock signal WCLKa to the transmission controller TXC, for example. At this time, the transmission controller TXC may output the original data odat based on the second clock signal WCLKa'. At this time, it is assumed that a bitwidth of the original data lane TE is N bits. In an embodiment, the original data lane TE may be configured of N parallel lines, and thus may transmit the original data odat of N bit per one clock, for example.

The second frequency (P' MHz) may satisfy Equation 2 below.

$$P' \text{ MHz}=(P \text{ MHz})*p/q \quad \text{[Equation 2]}$$

At this time, q may be an integer obtained by adding the number of overhead packet TCD1 and the number of encoded packets TGDP1$p$ to TGDP31$p$ corresponding to the overhead packet TCD1. In an embodiment, referring to FIG. 2, since the number of overhead packet TCD1 is 1 and the number of corresponding encoded packets TGDP1$p$ to TGDP31$p$ is 31, q may be 32, for example. At this time, p may be an integer obtained by subtracting the number of overhead packets TCD1 from q. In an embodiment, p may be 31. At this time, the second frequency (P' MHz) may be approximately 363.3 MHz, for example. Referring to FIG. 3, the second clock signal WCLKa' may maintain a low level during one period (31/32 Gating).

Therefore, in the illustrated embodiment, since the transmission controller TXC operates based on the second clock signal WCLKa' of a lower second frequency P' MHz, power consumption may be reduced. That is, power consumption may be reduced by differently applying a frequency of a clock signal according to presence or absence of an overhead packet of each lane.

Hereinafter, it is assumed that the transmission and reception interface between the transmitter TXDa and the receiver RXDa is configured in a pulse amplitude modulation 4 ("PAM4") method. However, the transmission and reception interface may be configured in other conventional communication interfaces including non-return-to-zero ("NRZ").

The transmission driver ABE may generate a first voltage signal DPs and a second voltage signal DNs corresponding to the encoded data edat, apply the first voltage signal DPs to a first transmission line DP, and apply the second voltage signal DNs to a second transmission line DN. The transmission driver ABE may transmit data in 2-bit unit, data corresponding to an MSB of 2-bit data may be converted into the first voltage signal DPs, and data corresponding to an LSB of 2-bit data may be converted into the second voltage signal DNs.

Referring to FIG. 4, the first voltage signal DPs may have one of a first logic level LV1, a second logic level LV2, a third logic level LV3, and a fourth logic level LV4. In addition, the second voltage signal DNs may have one of the first logic level LV1, the second logic level LV2, the third logic level LV3, and the fourth logic level LV4. In an embodiment, the first logic level LV1 may be set to 300 millivolts (mV), the second logic level LV2 may be set to 500 mV, the third logic level LV3 may be set to 700 mV, and the fourth logic level LV4 may be set to 900 mV, for example.

In an embodiment, when bit data of the MSB is "1" and bit data of the LSB is "0", the transmission driver ABE may set the first voltage signal DPs to the fourth logic level LV4 and set the second voltage signal DNs to the first logic level LV1, to express a first pattern PT1, for example.

In an embodiment, when the bit data of the MSB is "1" and the bit data of the LSB is "1", the transmission driver ABE may set the first voltage signal DPs to the third logic level LV3 and set the second voltage signal DNs to the second logic level LV2, to express a second pattern PT2, for example.

In an embodiment, when the bit data of the MSB is "0" and the bit data of the LSB is "1", the transmission driver ABE may set the first voltage signal DPs to the second logic level LV2 and set the second voltage signal DNs to the third logic level LV3, to express a third pattern PT3, for example.

In an embodiment, when the bit data of the MSB is "0" and the bit data of the LSB is "0", the transmission driver ABE may set the first voltage signal DPs to the first logic level LV1 and set the second voltage signal DNs to the fourth logic level LV4, to express a fourth pattern PT4, for example.

The receiver RXDa may include an analog front-end AFE, a decoder DEC, and a reception controller RXC.

The analog front-end AFE may receive the first voltage signal DPs and the second voltage signal DNs, and generate reception data edat' corresponding to a combination of the first voltage signal DPs and the second voltage signal DNs.

In an embodiment, the analog front-end AFE may generate the reception data edat' by a difference between the first voltage signal DPs and the second voltage signal DNs, for example. Referring to FIG. 5, when the difference (e.g., 600 mV) between the first voltage signal DPs and the second voltage signal DNs is greater than a third threshold value (+2 threshold), the analog front-end AFE may determine that the first pattern PT1 is received. In addition, when the difference (e.g., 200 mV) between the first voltage signal DPs and the second voltage signal DNs is between a second threshold value (0 threshold) and the third threshold value (+2 threshold), the analog front-end AFE may determine that the second pattern PT2 is received. In addition, when the difference (e.g., −200 mV) between the first voltage signal DPs and the second voltage signal DNs is between a first threshold value (−2 threshold) and the second threshold value (0 threshold), the analog front-end AFE may determine that the third pattern PT3 is received. In addition, when the difference (e.g., −600 mV) between the first voltage signal DPs and the second voltage signal DNs is less than the first threshold value (−2 threshold), the analog front-end AFE may determine that the fourth pattern PT4 is received.

The analog front-end AFE may provide reception data edat' corresponding to the patterns PT1, PT2, PT3, and PT4. In an embodiment, the reception data edat' may be the same as the encoded data edat, for example.

The decoder DEC may generate decoded data odat' by the reception data edat'. The decoded data odat' may be the same as the original data odat.

Referring to FIG. 6, the decoder DEC may decode the encoded packets TGDP1$p$, TGDP2$p$, TGDP3$p$, . . . , and TGDP31$p$ into decoded data odat'. In an embodiment, the decoder DEC may generate original packets ADP1$p$, ADP2$p$, ADP3$p$, . . . , and ADP31$p$ by performing an XOR operation on the overhead packet TCD1 and the encoded packets TGDP1$p$ to TGDP31$p$, for example. In an embodiment, the decoder DEC may generate the original packet ADP1$p$ by performing an XOR operation on corresponding bits of the encoded packet TGDP1$p$ and the overhead packet TCD1, for example. In an embodiment, when the encoded packet TGDP1$p$ is 011010 and the overhead packet TCD1 is 001101, the original packet ADP1$p$ may be set to 010111, for example.

The reception controller RXC may receive the decoded data odat' from the decoder DEC. The reception controller RXC may be an independent dedicated controller of the receiver RXDa itself, or may be a portion of a general-purpose controller of a device in which the receiver RXDa is used.

The transceiver TSCVb of FIG. 7 may include a transmitter TXDb and a receiver RXDb. Since a first original data lane TE1, first original data odat1, a first encoded data lane EA1, first encoded data edat1, first and second transmission lines DP1 and DN1, the first reception data edat1', and first decoded data odat1' correspond to the original data lane TE, the original data odat, the encoded data lane EA, the encoded data edat, the first and second transmission lines DP and DN, the reception data edat', and the decoded data odat' described above, a repetitive description is omitted.

In addition, since a second original data lane TE2, second original data odat2, a second encoded data lane EA2, second encoded data edat2, first and second transmission lines DP2 and DN2, second reception data edat2', and second decoded data odat2' correspond to the original data lane TE, the original data odat, the encoded data lane EA, the encoded data edat, the first and second transmission lines DP and DN, the reception data edat', and the decoded data odat' described above, a repetitive description is omitted.

However, in FIG. 7, in order to easily express a correspondence relationship between data, the first reception data edat1' and the second reception data edat2' are distinguished, and the first decoded data odat1' and the second decoded data odat2' are distinguished. The disclosure is characterized in a configuration of the transmitter TXDb, and the receiver RXDb has no problem in implementing the disclosure even though the receiver RXDb has the configuration of FIG. 1 or another conventional configuration. That is, it is sufficient for the receiver RXDb to satisfy a specification and a protocol of the transmission and reception interface, and is not limited to a particular configuration. Therefore, embodiments of the disclosure are not limited to the configuration of the receiver RXDa or RXDb.

FIGS. 8 to 12 are diagrams illustrating other embodiments of transceivers according to the disclosure. In describing FIG. 8 or subsequent drawing figures, a description of contents repetitive to that of FIGS. 1 to 7 is omitted.

Figure 8:
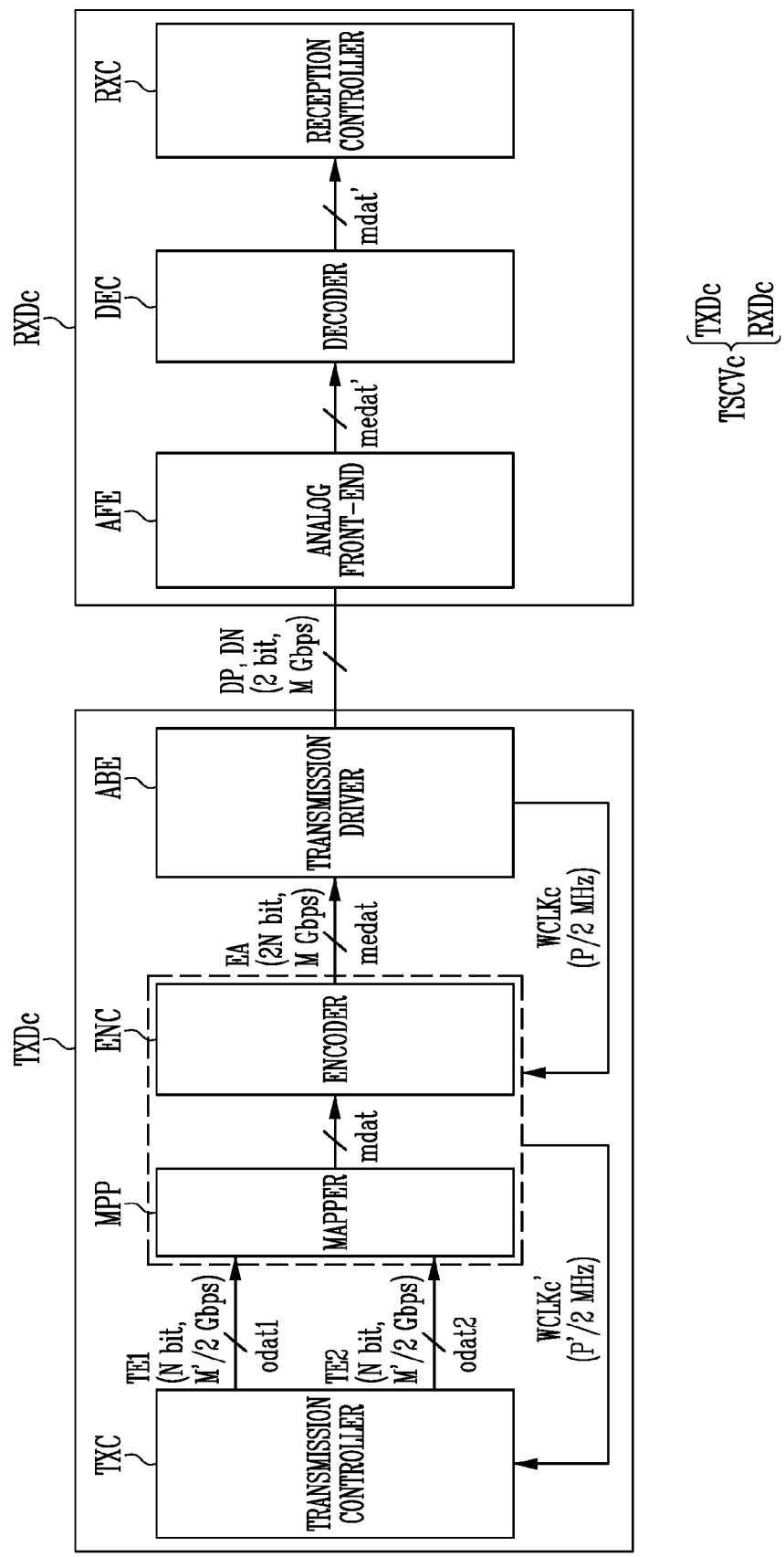
FIGS. 8 to 12 are diagrams illustrating other embodiments of transceivers according to the disclosure.

The embodiment of FIG. 8 has a characteristic in which power consumption may be reduced by applying a clock signal having a minimum frequency under an assumption that a maximum bitwidth of each of the lanes TE1, TE2, and EA of the transmitter TXDc is limited. In the illustrated embodiment, a case where the maximum bitwidth of the first original data lane TE1 is limited to N bits, the maximum bitwidth of the second original data lane TE2 is limited to N bits, and the maximum bitwidth of the encoded data lane EA is limited to 2N bits is assumed. It is assumed that the first original data lane TE1 is configured of N parallel lines, the second original data lane TE2 is configured of N parallel lines, and the encoded data lane EA is configured of 2N parallel lines.

The transmission controller TXC may output the first original data odat1 through the first original data lane TE1 and output the second original data odat2 through the second original data lane TE2.

A mapper MPP may generate mapping data mdat by mapping the first original data odat1 and the second original data odat2. In an embodiment, referring to FIG. 10, the mapper MPP may determine bytes of the first original data odat1 as even-numbered bytes, and determine bytes of the second original data odat2 as odd-numbered bytes, to generate the mapping data mdat, for example. However, the mapper MPP is meaningful in generating the mapping data mdat using the first original data odat1 and the second original data odat2, and a person skilled in the art may freely correct a method how to combine the first original data odat1 and the second original data odat2. Therefore, a mapping method of the mapper MPP cannot limit the scope of the disclosure. The mapping data mdat may include original packets.

The encoder ENC may encode the mapping data mdat into encoded data medat and output the encoded data medat through the encoded data lane EA. The encoded data medat may include an overhead packet and encoded packets corresponding to the overhead packet. The number of original packets and the number of encoded packets may be the same. The encoder ENC may encode the original packets into encoded packets by the overhead packet. The encoder ENC may generate the encoded packets by performing an XOR operation on the overhead packet and the original packets.

The transmission driver ABE may output the encoded data medat at a speed of M Gbps through transmission and reception interfaces DP and DN. The transmission driver ABE may provide the first clock signal WCLKc corresponding to the output speed (M Gbps) to the encoder ENC, and the encoder ENC may output the encoded data medat based on the first clock signal WCLKc. Further, in an embodiment, an analog front-end AFE may output reception mapping data medat' to the decoder DEC, and the decoder DEC may output decoded mapping data mdat' to a reception controller RXC.

As described with reference to FIG. 1, in order to achieve the output speed (M Gbps) of the transmission driver ABE, the encoder ENC is desired to transmit the encoded data medat at the speed of M Gbps through the encoded data lane EA.

Figure 9:
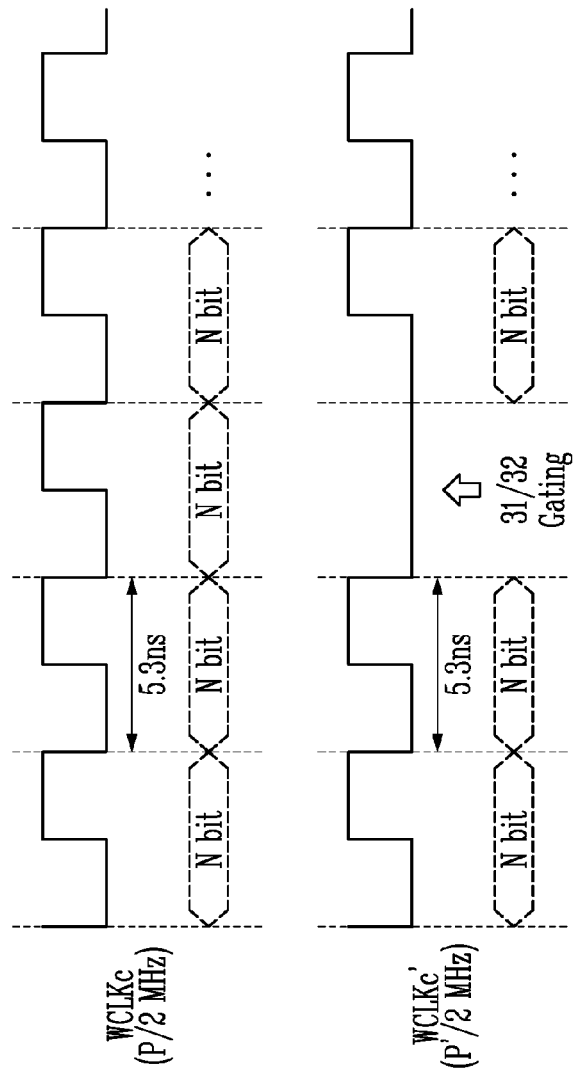

The encoder ENC may provide the second clock signal WCLKc' having a second frequency (P'/2 MHz) less than the first frequency (P/2 MHz) of the first clock signal WCLKc to the transmission controller TXC. The transmission controller TXC may output the first original data odat1 and the second original data odat2 based on the second clock signal WCLKc'. Referring to FIG. 9, one clock period of the second clock signal WCLKc' is gated for the transmission controller TXC that is not desired to transmit a packet corresponding to the overhead packet TCD1. Therefore, the second frequency (P'/2 MHz) may be less than the first frequency (P/2 MHz). As described above, power consumption of the transmission controller TXC may be reduced.

Therefore, the transmission controller TXC may output the first original data odat1 through the first original data lane TE1 at a speed M/2 Gbps or less (M'/2 Gbps). In addition, the transmission controller TXC may output the second original data odat2 through the second original data lane TE2 at a speed M/2 Gbps or less (M'/2 Gbps).

In the illustrated embodiment, in order for the encoder ENC to reach the output speed (M Gbps), the minimum frequency of the first clock signal WCLKc is P/2 MHz, and is desired to satisfy Equation 3 below.

$$P/2 \text{ MHz} = (M \text{ Gbps}) * 1000/2N \qquad \text{[Equation 3]}$$

In an embodiment, when using the encoded data lane EA having a bitwidth of 32 bits (N=16), when the output speed of the encoder ENC is to be 6 Gbps (M=6), the minimum frequency of the first clock signal WCLKc is desired to be 187.5 MHz (P/2=187.5), for example. Therefore, in the illustrated embodiment, power consumption may be reduced by applying the clock signal having the minimum frequency according to the maximum bitwidth of each lane. That is, as compared to the embodiment of FIG. 1, the frequency of the clock signal may be halved, and thus power consumption of the transmission controller TXC and the encoder ENC may be reduced.

The second frequency (P'/2 MHz) may be p/q of the first frequency (P/2 MHz). q may be an integer obtained by adding the number of overhead packets and the number of encoded packets corresponding to the overhead packets. In an embodiment, p may be an integer obtained by subtracting the number of overhead packets from q. In an embodiment, when p/q is 31/32, the second frequency (P'/2 MHz) of the second clock signal WCLKc' may be approximately 181.6 MHz, for example.

Figure 10:
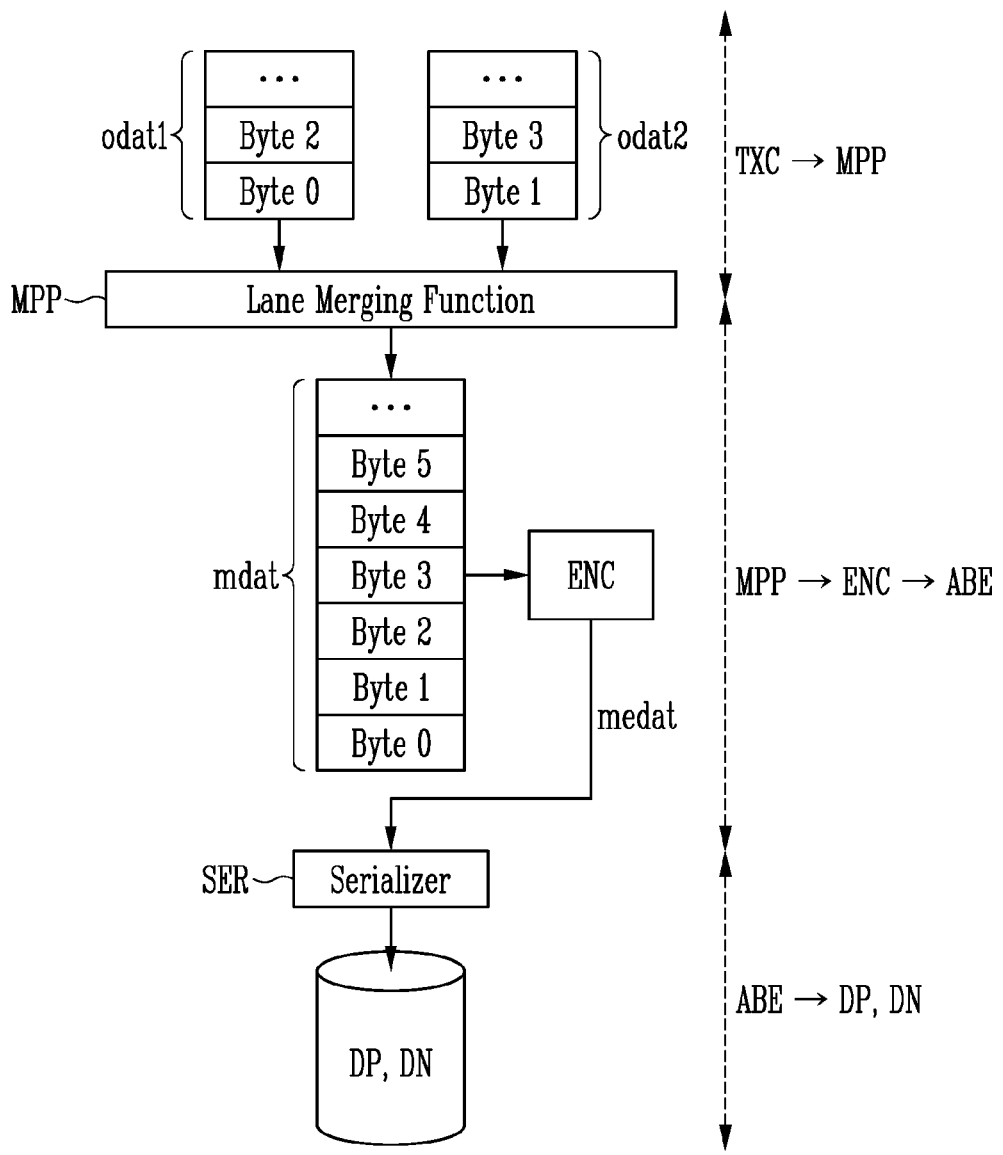

Referring to FIG. 10, the transmission driver ABE may include a serializer SER. The serializer SER may serialize the encoded data medat into data corresponding to each of the first transmission line DP and the second transmission line DN of the transmission and reception interface.

Figure 11:
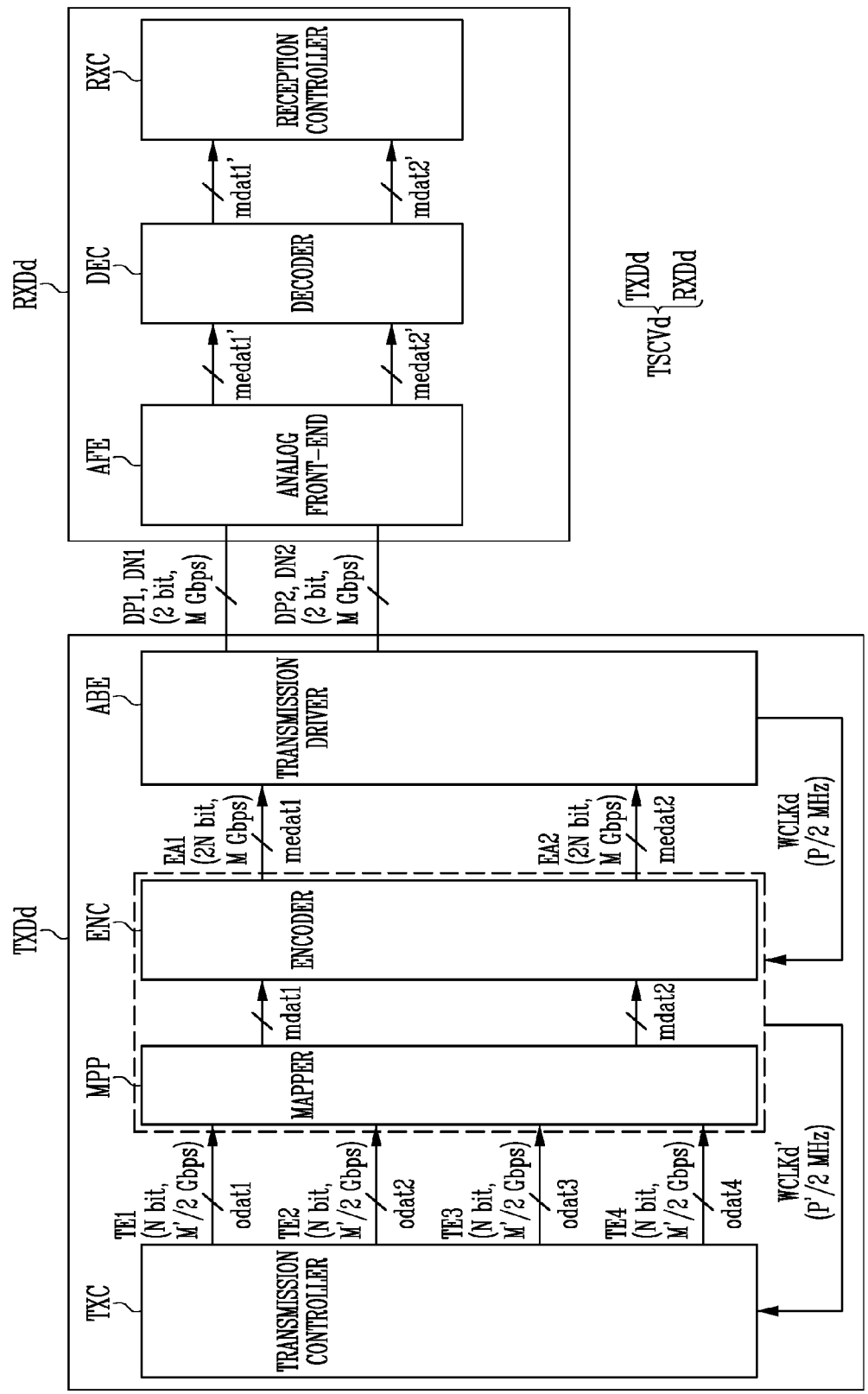

Referring to FIG. 11, a case in which the transceiver TSCVd includes a transmitter TXDd and a receiver RXDd is illustrated. The transceiver TSCVd of FIG. 11 is an embodiment showing a case in which data is processed in parallel when the number of lanes is expanded twice based on the transceiver TSCVc of FIG. 8. That is, in an embodiment, a transmission controller TXC may output first to fourth original data odat1 to odat4 through first to fourth original data lanes TE1 to TE4, a mapper MPP may output first and second mapping data mdat1 and mdat2, an encoder ENC may output first and second encoded data medat1 and medat2, a transmission driver ABE may output the first and second encoded data medat1 and medat2 through first transmission and reception interfaces DP1 and DN1 and second transmission and reception interfaces DP2 and DN2, an analog front-end AFE may output first and second reception mapping data medat1' and medat2' and the decoder DEC may output first and second decoded mapping data mdat1' and mdat2', for example. Since an operation of the transceiver TSCVd of FIG. 11 is substantially the same as processing two transceivers TSCVc of FIG. 8 in parallel, a repetitive description is omitted.

Figure 12:
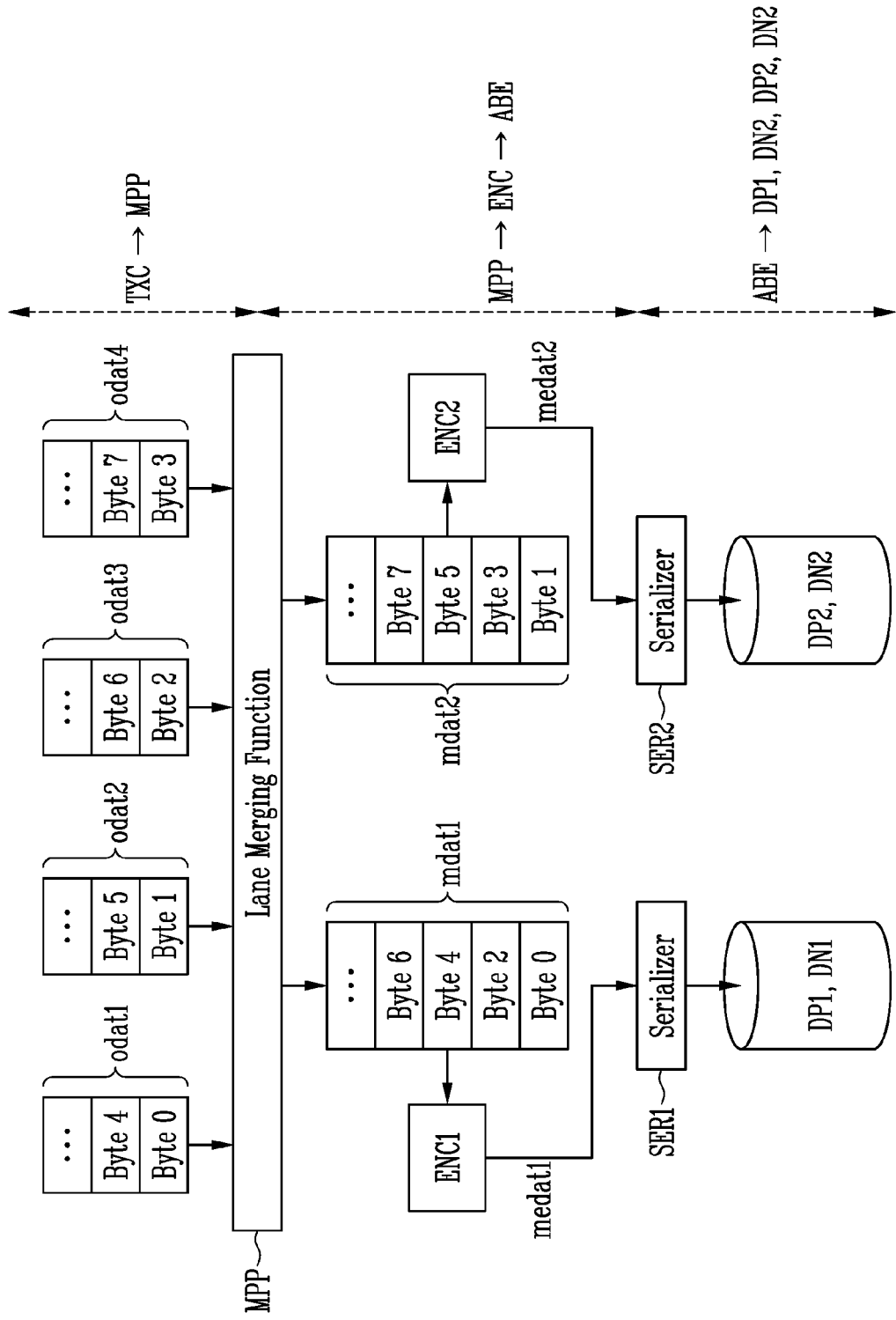

Referring to FIG. 12, for parallel processing, the encoder ENC may include a first encoder ENC1 and a second encoder ENC2. In addition, the serializer SER may include a first serializer SER1 and a second serializer SER2. Since data processing of FIG. 12 is substantially the same as that of performing data processing of FIG. 10 in parallel, a repetitive description is omitted.

Figure 13:
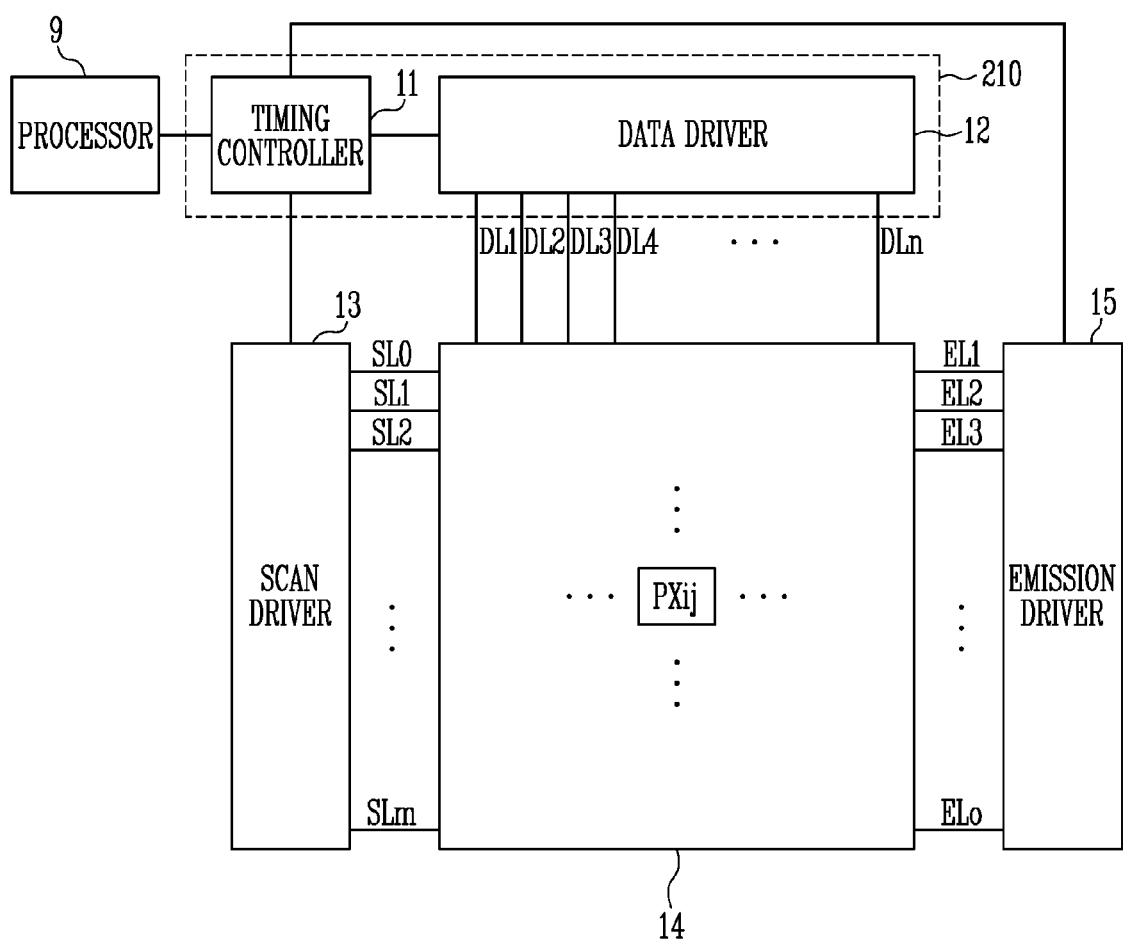
FIG. 13 is a diagram illustrating an embodiment of a display device according to the disclosure.

FIG. 13 is a diagram illustrating an embodiment of a display device according to the disclosure.

Referring to FIG. 13, the display device may include a timing controller ("TCON") 11, a data driver 12, a scan driver 13, a pixel unit 14, and an emission driver 15. However, whether each functional unit is integrated into one integrated circuit ("IC"), integrated into a plurality of ICs, or disposed (e.g., mounted) on a display substrate may be variously configured according to a specification of the display device. The TCON 11 and the data driver 12 may be integrated into one IC and may be configured as one display driver 210. At this time, the display driver 210 may be also referred to as a TCON embedded driver IC ("TED"). According to a type, the display driver 210 may further include at least one of the scan driver 13 and the emission driver 15.

A processor 9 may correspond to at least one of a graphics processing unit ("GPU"), a central processing unit ("CPU"), an application processor ("AP"), or the like. The processor 9 may correspond to the above-described transmitters TXDa, TXDb, TXDc, and TXDd. The TCON 11, the data driver 12, or the display driver 210 may correspond to the above-described receivers RXDa, RXDb, RXDc, and RXDd (refer to FIGS. 1 to 12).

The TCON 11 may receive grayscales and timing signals for each display frame period from the processor 9. The timing signals may include a vertical synchronization signal, a horizontal synchronization signal, a data enable signal, or the like.

Each cycle of the vertical synchronization signal may correspond to each display frame period. Each cycle of the horizontal synchronization signal may correspond to each horizontal period. The grayscales may be supplied in a horizontal line unit in each horizontal period in response to a pulse of the data enable signal. The horizontal line may mean pixels (e.g., a pixel row) connected to the same scan line and emission line.

The TCON 11 may render the grayscales to correspond to the specification of the display device. In an embodiment, the processor 9 may provide a red grayscale, a green grayscale, and a blue grayscale for each unit dot, for example. In an embodiment, when the pixel unit 14 has an RGB stripe structure, the pixels may correspond to each grayscale one-to-one, for example. In this case, rendering of the grayscales may not be desired. However, e.g., when the pixel unit 14 has a PENTILE™ structure, since the pixel is shared by adjacent unit dots, the pixels may not correspond to each grayscale one-to-one. In this case, rendering of the grayscales may be desired. The rendered or non-rendered grayscales may be provided to the data driver 12. In addition, the TCON 11 may provide a data control signal to the data driver 12. In addition, the TCON 11 may provide a scan control signal to the scan driver 13 and may provide an emission control signal to the emission driver 15.

The data driver 12 may generate data voltages (that is, data signals DLn) to be provided to data lines DL1, DL2, DL3, DL4, . . . , and DLn using the grayscales and the data control signal received from the TCON 11. Here, n may be an integer greater than 0.

The scan driver 13 may generate scan signals to be provided to scan lines SL0, SL1, SL2, . . . , and SLm using the scan control signal (e.g., a clock signal, a scan start signal, or the like) received from the TCON 11. The scan driver 13 may sequentially supply scan signals having a pulse of a turn-on level to the scan lines SL0 to SLm. Here, m may be an integer greater than 0. The scan driver 13 may include scan stages configured in a form of a shift register. The scan driver 13 may generate the scan signals in a method of sequentially transferring the scan start signal that is a pulse form of a turn-on level to a next scan stage according to control of the clock signal.

The emission driver 15 may generate emission signals to be provided to emission lines EL1, EL2, EL3, . . . , and ELo using the emission control signal (e.g., a clock signal, an emission stop signal, or the like) received from the timing control unit 11. Here, o may be an integer greater than 0. The emission driver 15 may sequentially supply emission signals having a pulse of a turn-off level to the emission lines EL1 to ELo. The emission driver 15 may include emission stages configured in a form of a shift register. The emission driver 15 may generate the emission signals in a method of sequentially transferring the emission stop signal that is a pulse form of a turn-off level to a next emission stage according to control of the clock signal.

The pixel unit 14 includes the pixels. Each pixel PXij may be connected to corresponding data line, scan line, and emission line. The pixels may include pixels emitting light of a first color, pixels emitting light of a second color, and pixels emitting light of a third color. The first color, the second color, and the third color may be different colors. In an embodiment, the first color may be one of red, green, and blue, the second color may be one other than the first color among red, green, and blue, and the third color may be one other than the first color and the second color among red, green, and blue, for example. In addition, magenta, cyan, and yellow may be used instead of red, green, and blue as the first to third colors.

Figure 14:
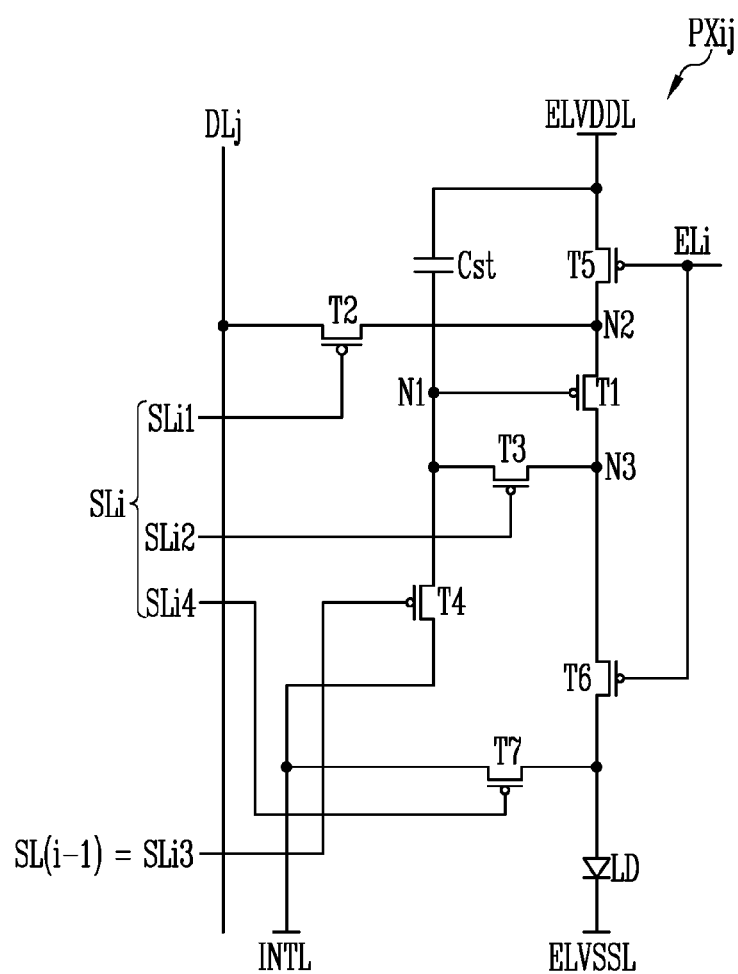
FIG. 14 is a diagram illustrating an embodiment of a pixel according to the disclosure.

FIG. 14 is a diagram illustrating an embodiment of a pixel according to the disclosure.

Referring to FIG. 14, the pixel PXij includes transistors T1, T2, T3, T4, T5, T6, and T7, a storage capacitor Cst, and a light-emitting element LD.

Hereinafter, a circuit configured of a P-type transistor is described as an example. However, those skilled in the art will be able to design a circuit configured of an N-type transistor by differentiating a polarity of a voltage applied to a gate terminal. Similarly, those skilled in the art will be able to design a circuit configured of a combination of a P-type transistor and an N-type transistor. The P-type transistor is collectively referred to as a transistor in which a current amount increases when a voltage difference between a gate electrode and a source electrode increases in a negative direction. The N-type transistor is collectively referred to as a transistors in which a current amount increases when a voltage difference between a gate electrode and a source electrode increases in a positive direction. The transistor may be configured in various forms such as a thin film transistor ("TFT"), a field effect transistor ("FET"), and a bipolar junction transistor ("BJT").

The first transistor T1 may include a gate electrode connected to a first node N1, a first electrode connected to a second node N2, and a second electrode connected to a third node N3. The first transistor T1 may be also referred to as a driving transistor.

The second transistor T2 may include a gate electrode connected to a scan line SLi1, a first electrode connected to a data line DLj, and a second electrode connected to the second node N2. The second transistor T2 may be also referred to as a scan transistor.

The third transistor T3 may include a gate electrode connected to a scan line SLi2, a first electrode connected to the first node N1, and a second electrode connected to the third node N3. The third transistor T3 may be also referred to as a diode connection transistor.

The fourth transistor T4 may include a gate electrode connected to a scan line SLi3, a first electrode connected to the first node N1, and a second electrode connected to an initialization line INTL. The fourth transistor T4 may be also referred to as a gate initialization transistor.

The fifth transistor T5 may include a gate electrode connected to an i-th emission line ELi, a first electrode connected to a first power line ELVDDL, and a second electrode connected to the second node N2. The fifth transistor T5 may be also referred to as an emission transistor. In another embodiment, the gate electrode of the fifth transistor T5 may be connected to an emission line different from an emission line connected to a gate electrode of the sixth transistor T6.

The sixth transistor T6 may include the gate electrode connected to the i-th emission line ELi, a first electrode connected to the third node N3, and a second electrode connected to an anode of the light-emitting element LD. The sixth transistor T6 may be also referred to as an emission transistor. In another embodiment, the gate electrode of the sixth transistor T6 may be connected to an emission line different from the emission line connected to the gate electrode of the fifth transistor T5.

The seventh transistor T7 may include a gate electrode connected to a scan line SLi4, a first electrode connected to the initialization line INTL, and a second electrode connected to the anode of the light-emitting element LD. The seventh transistor T7 may be also referred to as a light-emitting element initialization transistor.

A first electrode of the storage capacitor Cst may be connected to the first power line ELVDDL and a second electrode may be connected to the first node N1.

The anode of the light-emitting element LD may be connected to the second electrode of the sixth transistor T6 and a cathode may be connected to a second power line ELVSSL. The light-emitting element LD may be a light-emitting diode. The light-emitting element LD may be configured of an organic light-emitting element (organic light diode), an inorganic light-emitting element (inorganic light-emitting diode), a quantum dot/well light-emitting element (quantum dot/well light-emitting diode), or the like. The light-emitting element LD may emit light in any one of the first color, the second color, and the third color. In addition, although only one light-emitting element LD is provided in each pixel in the illustrated embodiment, a plurality of light-emitting elements may be provided in each pixel in another embodiment. At this time, the plurality of light-emitting elements may be connected in series, parallel, series-parallel, or the like.

The first power line ELVDDL may be supplied with a first power voltage, the second power line ELVSSL may be supplied with a second power voltage, and the initialization line INTL may be supplied with an initialization voltage. In an embodiment, the first power voltage may be greater than the second power voltage, for example. In an embodiment, the initialization voltage may be equal to or greater than the second power voltage, for example. In an embodiment, the initialization voltage may correspond to a data voltage of the smallest size among data voltages that may be provided, for example. In another embodiment, the size of the initialization voltage may be less than sizes of the data voltages that may be provided.

Figure 15:
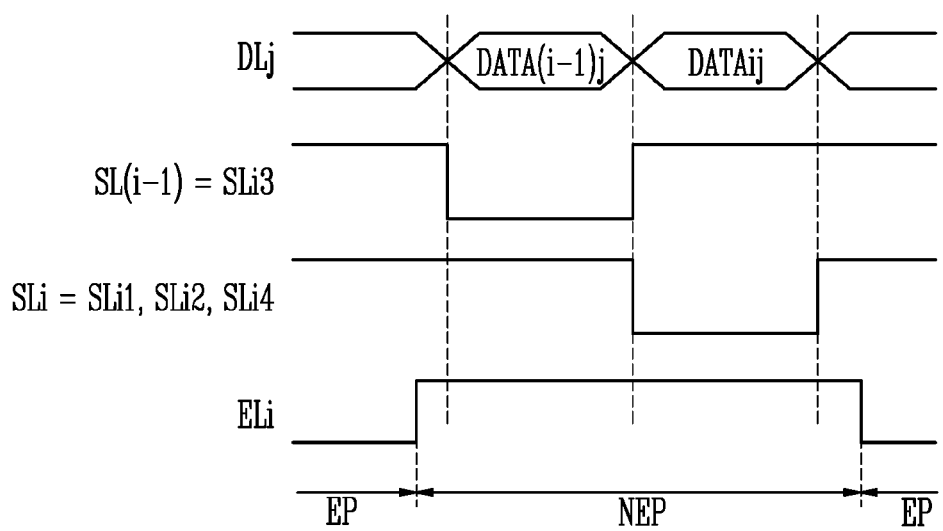
FIG. 15 is a diagram illustrating a method of driving the pixel of FIG. 14.

FIG. 15 is a diagram illustrating a method of driving the pixel of FIG. 14.

Hereinafter, for convenience of description, it is assumed that the scan lines SLi1, SLi2, and SLi4 are i-th scan lines SLi and the scan line SLi3 is an (i−1)-th scan line SL(i−1). However, a connection relationship of the scan lines SLi1, SLi2, SLi3, and SLi4 may be various. In an embodiment, the scan line SLi4 may be the (i−1)-th scan line or an (i+1)-th scan line.

First, an emission signal of a turn-off level (logic high level) is applied to the i-th emission line ELi, a data voltage DATA(i−1)j for an (i−1)-th pixel is applied to the data line DLj, and a scan signal of a turn-on level (logic low level) is applied to the scan line SLi3. The high/low of the logic level may vary according to whether a transistor is a P-type or an N-type.

At this time, since a scan signal of a turn-off level is applied to the scan lines SLi1 and SLi2, the second transistor T2 is turned off and the data voltage DATA(i−1)j is prevented from being input to the pixel PXij.

At this time, since the fourth transistor T4 is turned on, the first node N1 is connected to the initialization line INTL, and a voltage of the first node N1 is initialized. Since the emission signal of the turn-off level is applied to the emission line ELi, the transistors T5 and T6 are turned off, and light emission of an unnecessary light-emitting element LD according to an initialization voltage application process is prevented.

Next, a data voltage DATAij for the i-th pixel PXij is applied to the data line DLj, and the scan signal of the turn-on level is applied to the i-th scan lines SLi1 and SLi2. Accordingly, the transistors T2, T1, and T3 are turned on, and the data line DLj and the first node N1 are electrically connected with each other. Therefore, a compensation voltage obtained by subtracting a threshold voltage of the first transistor T1 from the data voltage DATAij is applied to the second electrode of the storage capacitor Cst (that is, the first node N1), and the storage capacitor Cst maintains a voltage corresponding to a difference between the first power voltage and the compensation voltage. Such a period may be also referred to as a threshold voltage compensation period or a data writing period.

In addition, when the scan line SLi4 is the i-th scan line, since the seventh transistor T7 is turned on, the anode of the light-emitting element LD and the initialization line INTL are connected with each other, and the light-emitting element LD is initialized to a charge amount corresponding to a voltage difference between the initialization voltage and the second power voltage.

Thereafter, as the emission signal of the turn-on level is applied to the i-th emission line ELi, the transistors T5 and T6 may be turned on. Therefore, a driving current path connecting the first power line ELVDDL, the fifth transistor T5, the first transistor T1, the sixth transistor T6, the light-emitting element LD, and the second power line ELVSSL.

A driving current amount flowing to the first electrode and the second electrode of the first transistor T1 is adjusted according to the voltage maintained in the storage capacitor Cst. The light-emitting element LD emits light with a luminance corresponding to the driving current amount. The light-emitting element LD emits light until the emission signal of the turn-off level is applied to the emission line ELi.

When the emission signal is the turn-on level, pixels receiving the corresponding emission signal may be in a display state. Therefore, a period in which the emission signal is the turn-on level may be also referred to as an emission period EP (or an emission allowable period). In addition, when the emission signal is the turn-off level, pixels receiving the corresponding emission signal may be in a non-display state. Therefore, a period in which the emission signal is the turn-off level may be also referred to as a non-emission period NEP (or an emission disallowable period).

The non-emission period NEP described with reference to FIG. 15 is for preventing the pixel PXij from emitting light with an undesired luminance during the initialization period and the data writing period.

One or more non-emission periods NEP may be additionally provided while data written in the pixel PXij is maintained (e.g., one frame period). This may be for effectively expressing a low grayscale by reducing the emission period EP of the pixel PXij, or for smoothly blurring a motion of an image.

The display device, the pixel, and the method of driving the same of FIGS. 13 to 15 are for illustrating one application embodiment of the above-described transceivers TSCVa, TSCVb, and TSCVc, and the disclosure is not limited to such an embodiment.

In an embodiment, the transceivers TSCVa, TSCVb, and TSCVc may be used for communication between the processor 9 and a camera device included in the display device, or may be used for communication between the processor 9 and a touch sensor (and other sensors), for example.

The drawings referred to so far and the detailed description of the disclosure described herein are merely some of embodiments of the disclosure, are used for merely describing the disclosure, and are not intended to limit the meaning and the scope of the disclosure described in claims. Therefore, those skilled in the art will understand that various modifications and equivalent other embodiments are possible from these. Thus, the true scope of the disclosure should be determined by the technical spirit of the appended claims.

What is claimed is:

1. A transmitter comprising:
a transmission controller which outputs original data through an original data lane;
an encoder which encodes the original data into encoded data and outputs the encoded data through an encoded data lane; and
a transmission driver which outputs the encoded data at a speed of M (M is a real number greater than 0) gigabits per second through a transmission and reception interface,
wherein the transmission driver provides a first clock signal corresponding to an output speed to the encoder,
the encoder provides a second clock signal having a second frequency less than a first frequency of the first clock signal to the transmission controller,
the transmission controller outputs the original data based on the second clock signal, and
the encoder outputs the encoded data based on the first clock signal.

2. The transmitter according to claim 1, wherein the original data includes original packets,
the encoded data includes an overhead packet and encoded packets corresponding to the overhead packet,
a number of the original packets and a number of the encoded packets are identical to each other, and
the encoder encodes the original packets into the encoded packets using the overhead packet.

3. The transmitter according to claim 2, wherein the encoder generates the encoded packets by performing an exclusive OR operation on the overhead packet and the original packets.

4. The transmitter according to claim 2, wherein the second frequency is p/q of the first frequency,
the q is an integer obtained by adding a number of the overhead packet and the number of the encoded packets corresponding to the overhead packet, and
the p is an integer obtained by subtracting the number of the overhead packet from q.

5. A transmitter comprising:
a transmission controller which outputs first original data through a first original data lane and outputs second original data through a second original data lane;
a mapper which generates mapping data by mapping the first original data and the second original data;
an encoder which encodes the mapping data into encoded data and outputs the encoded data through an encoded data lane; and
a transmission driver which outputs the encoded data at a speed of M (M is a real number greater than 0) gigabits per second through a transmission and reception interface,
wherein the transmission driver provides a first clock signal corresponding to an output speed to the encoder, and
the encoder outputs the encoded data based on the first clock signal.

6. The transmitter according to claim 5, wherein the encoder outputs the encoded data at the speed of M gigabits per second through the encoded data lane,
the transmission controller outputs the first original data at a speed of M/2 gigabits per second or less through the first original data lane, and
the transmission controller outputs the second original data at the speed of M/2 gigabits per second or less through the second original data lane.

7. The transmitter according to claim 6, wherein the first original data lane is configured of N (N is an integer greater than 0) parallel lines,
the second original data lane is configured of N parallel lines, and
the encoded data lane is configured of 2N parallel lines.

8. The transmitter according to claim 7, wherein the first frequency of the first clock signal is M*1000/2N megahertz.

9. The transmitter according to claim 5, wherein the encoder provides a second clock signal having a second frequency less than the first frequency of the first clock signal to the transmission controller, and the transmission controller outputs the first original data and the second original data based on the second clock signal.

10. The transmitter according to claim 9, wherein the mapping data includes original packets, the encoded data includes an overhead packet and encoded packets corresponding to the overhead packet, a number of the original packets and a number of the encoded packets are identical to each other, and the encoder encodes the original packets into the encoded packets using the overhead packet.

11. The transmitter according to claim 10, wherein the encoder generates the encoded packets by performing an exclusive OR operation on the overhead packet and the original packets.

12. The transmitter according to claim 10, wherein the second frequency is p/q of the first frequency, the q is an integer obtained by adding a number of the overhead packet and the number of the encoded packets corresponding to the overhead packet, and the p is an integer obtained by subtracting the number of the overhead packet from q.

13. A transceiver comprising a transmitter and a receiver connected through a transmission and reception interface, the transmitter comprising:

a transmission controller which outputs first original data through a first original data lane and outputs second original data through a second original data lane;

a mapper which generates mapping data by mapping the first original data and the second original data;

an encoder which encodes the mapping data into encoded data and outputs the encoded data through an encoded data lane; and a transmission driver which outputs the encoded data at a speed of M (M is a real number greater than 0) gigabits per second through the transmission and reception interface, wherein the transmission driver provides a first clock signal corresponding to an output speed to the encoder, and the encoder outputs the encoded data based on the first clock signal.

14. The transceiver according to claim 13, wherein the encoder outputs the encoded data at the speed of M gigabits per second through the encoded data lane, the transmission controller outputs the first original data at a speed of M/2 gigabits per second or less through the first original data lane, and the transmission controller outputs the second original data at the speed of M/2 gigabits per second or less through the second original data lane.

15. The transceiver according to claim 14, wherein the first original data lane is configured of N (N is an integer greater than 0) parallel lines, the second original data lane is configured of N parallel lines, and the encoded data lane is configured of 2N parallel lines.

16. The transceiver according to claim 15, wherein a first frequency of the first clock signal is M*1000/2N megahertz.

17. The transceiver according to claim 13, wherein the encoder provides a second clock signal having a second frequency less than a first frequency of the first clock signal to the transmission controller, and the transmission controller outputs the first original data and the second original data based on the second clock signal.

18. The transceiver according to claim 17, wherein the mapping data includes original packets, the encoded data includes an overhead packet and encoded packets corresponding to the overhead packet, a number of the original packets and a number of the encoded packets are identical to each other, and the encoder encodes the original packets into the encoded packets using the overhead packet.

19. The transceiver according to claim 18, wherein the encoder generates the encoded packets by performing an exclusive OR operation on the overhead packet and the original packets.

20. The transceiver according to claim 18, wherein the second frequency is p/q of the first frequency, the q is an integer obtained by adding a number of the overhead packet and the number of the encoded packets corresponding to the overhead packet, and the p is an integer obtained by subtracting the number of the overhead packet from q.

* * * * *